United States Patent Office 3,290,210

Patented Dec. 6, 1966

1

3,290,210
METHOD OF MAKING A DRY WATER DISPERSIBLE BORDEAUX COMPOSITION

Lester F. Engle and Howard E. Day, Calumet, Mich., assignors to Calumet & Hecla, Inc., a corporation of Michigan No Drawing. Filed June 21, 1965, Ser. No. 465,708
4 Claims. (Cl. 167—16)

This invention relates to a method of making a dry fungicidal Bordeaux composition that is readily water dispersible.

Bordeaux-type fungicides containing copper and zinc in the form of aqueous dispersions have long been known and widely used in agriculture. Thus, fungicides of this type are polybasic cupric calcium sulfate commonly referred to as Bordeaux mixture and similar zinc calcium sulfate. The use of Bordeaux mixture raises many problems, especially when used on a large scale, because to be most effective the Bordeaux mixture formerly had to be freshly made and used promptly. The reason for this was that when the prepared Bordeaux mixture was allowed to stand it disintegrated rapidly with a consequent loss in fungicidal activity.

There have been many attempts to prepare a dry Bordeaux mixture that could be used merely by dispersing in water, as by agitation, but these attempts have not been successful to the necessary degree. There have also been attempts to solve this problem by providing a Bordeaux mixture concentrate in which only a portion of the aqueous liquid was present. This has been at best only a partial solution to the problem.

We have produced a dry Bordeaux type powder that can be readily dispersed with agitation in water or similar aqueous liquids and the resulting Bordeaux mixture has substantially full fungicidal activity and has other desirable properties such as uniform dispersion in the liquid and excellent tenacity and coverage of the agricultural plant to which the mixture is applied. The fungicidal activity approaches that of Bordeaux mixture prepared in the usual way by mixing copper sulfate and/or zinc sulfate with calcium hydroxide in water.

One of the features of this invention therefore is to provide an improved method of making a dry Bordeaux-type fungicidal composition containing zinc and/or copper capable of being readily dispersed in water or aqueous liquid to form a stable aqueous dispersion usable for fungicidal purposes.

Other features and advantages of the invention will be apparent from the following description thereof in conjunction with certain specific examples.

The method of this invention includes producing an aqueous dispersion of the Bordeaux fungicidal composition in the customary manner and incorporating therein a dispersing-stabilizing agent of the type described in detail hereinafter. This liquid dispersion is then spray dried in the customary manner by spraying into a heated gaseous fluent such as heated air to form dry powder particles. The spray drying is to the customary degree where the individual particles are dry to the touch and non-adherent to each other and to the drying chamber in which they are deposited. The resulting product is a finely divided powder of very uniform particle size which, of course, is easily obtained by ordinary spray drying techniques. This powder has excellent storability in that it does not lose substantially its fungicidal character even when stored for long periods of time.

What is quite surprising is that the product can not only be readily re-dispersed in water with ordinary agitation but that the resulting redispersion or suspension is itself stable with little or no settling even over long periods of

2 time and this redispersion has substantially the same fungicidal character as the original dispersion before being dried. These characteristics of the dry powder are completely contrary to past experience and the exact reasons why these results are obtained with this invention are not known. Apparently, however, these improved characteristics of the powder are obtained primarily by the use of the dispersing-stabilizing agent as without this agent present these improved characteristics are not obtained.

The aqueous Bordeaux mixtures from which the dry powders of this invention are obtained by spray drying may be prepared in the ordinary manner. Thus, it is customary to prepare Bordeaux mixture from conventional sources of calcium hydroxide and copper sulfate and from calcium hydroxide and zinc sulfate. The calcium hydroxide is, of course, formed by mixing calcium oxide with water. The copper is preferably in the form of copper sulfate which may or may not contain water of hydration. The zinc is preferably in the form of zinc sulfate. The calcium hydroxide and the copper and/or zinc sulfate may be mixed together in desired proportions in the customary manner. Thus, if a 2:1 weight ratio is desired, 2 parts by weight of sulfate to 1 part by weight of calcium hydroxide, or their equivalents, are used to make the Bordeaux mixture wtih added water. If the ratio in the final product is a 1:1 ratio, then equal parts of the two chemicals are used. The amount of water used to make the Bordeaux mixture before spray drying is at least enough to make the Bordeaux reaction complete and to produce a slurry that can easily be handled by the spray drying equipment. Excess water is avoided as requiring unnecessary removal time and temperatures in the spray drying.

Bordeaux mixtures are usually identified by composition figures of which 4–4–50 is an example. This proportion indicates that there are 4 pounds of copper sulfate pentahydrate and 4 pounds of calcium hydroxide combined in a total volume of 50 gallons of water. A common proportion is 0.5–2–100 as this has been effective in controlling fireblight on apples. To prepare this composition the ratio of copper sulfate pentahydrate and calcium hydroxide or hydrated lime would be 0.5 pound to 2.0 pounds. Then, sufficient total water would be used to give the 100 gallons. To control early blight on celery, an 8–4–100 Bordeaux is customarily used. Here, the dry powder of this invention would have a 2:1 ratio of hydrated copper sulfate and calcium hydroxide. In this instance, as in the others discussed herein, the ratio of copper sulfate and lime to water would be achieved by merely stirring the powder into the proper volume of water. Analogous preparations are prepared with zinc sulfate or mixtures of copper sulfate and zinc sulfate.

As stated earlier, an essential ingredient in practicing the method of this invention and achieving the resulting product with the superior but surprising advantages discussed above is the dispersing-stabilizing agent. The agents usable in this invention are not limited to particular kinds or types but may be any of those that are water soluble, surface active and are chemically stable while undergoing spray drying and are chemically stable in the presence of the other ingredients. Excellent surface active agents for use in this invention are water soluble lignosulfonate salts such as the alkali and alkaline earth metal lignosulfonates. These are preferred because they are effective, relatively inexpensive and easy to use. Other agents that may also be used include ditertiary acetylenic glycol, dimethyl octynediol, sodium N-methyl-N-palmitoyllaurate, dodecyl pyridinium chloride and the like.

The dispersing-stabilizing agent is preferably used in an amount of about 1–20% by weight of the total solids in the wet slurry, although higher or lower amounts may be employed, if desired, depending on the ultimate uses, specific agent used and other factors. Increasing the amount above 20% appears to have very little if any added effect on the function of the product. The amount of agent used should not be too little. If insufficient agent is employed, the redispersing of the powder in water prior to use is unsatisfactory and likely to contain agglomerates that tend to settle out. An especially preferred concentration of agent in the total solids is about 2–10% by weight.

In the preparation of the dry powder of this invention other ingredients can be included in the Bordeaux mixture prior to spray drying. Thus, other surface active materials in addition to the dispersing-stabilizing agent described herein may be added. These are sometimes helpful in improving the wetting characteristic of the redispersed powder or in emulsifying the ingredients. These additional surface active agents are especially useful when the Bordeaux mixture is applied to waxy surfaces such as the leaves of the banana plant. Also, other fungicidal and biocidal agents may be included so long as they, like the added surface active agent, are stable to the conditions of drying and to the other ingredients. Typical surface active agents that may be used in addition to the previously described dispersing-stabilizing agent include polyoxyethylene sorbitan monolaurate, polyoxyethylene octylphenol, tridecyl alcohol, polyoxyethylene nonylphenol and the like.

As stated, the spray drying methods used to reduce the Bordeaux mixture are conventional. Thus, the mixture requires no special treatment prior to the spray drying. As is customary, the slurry may range in viscosity from a mobile liquid to a paste consistency which requires force, as by pumping, to direct it through the drying apparatus.

As is customary, the temperatures may vary widely and the other conditions of drying may also be varied. The temperatures employed in the spray drying procedure may also be varied. The temperatures employed in the spray drying procedure may vary at the gas inlet from about 250–600° F. and at the gas outlet from about 190–300° F. In spray drying techniques it is preferred to employ inlet-outlet temperatures with the largest gradients in order to obtain maximum fuel economy. Obviously, the temperatures used should be such that none of the ingredients of the slurry are chemically decomposed. Because of the cooling effect of the spraying, however, temperatures higher than those which would normally cause Bordeaux decomposition can be employed. This is true because the evaporation of liquid during the drying has a cooling effect.

In actual practice, it has been found that Bordeaux mixture slurries of about 15–20 weight percent solids are ideal for spray drying. As indicated above, however, this is not a requirement as the viscosity may vary from a paste to a thin liquid.

Furthermore, the feeding rate of the slurry into the spray drying equipment is not critical to the invention and can be varied over a wide range as is true in normal spray drying techniques. Thus, with the temperatures noted above by way of example, the feed rate can be varied easily from 175–400 cc. per minute with no apparent differences in the dried product. Thus, the temperature, concentration of the Bordeaux mixture slurry, feed rate, slurry viscosity, air velocity and the other factors of spray drying, although interrelated, are not critical to the invention. The principal requirements are that the drying conditions are such that the product and its individual ingredients are not decomposed and that the product is in the form of a powder, the individual particles of which do not adhere to each other or to the equipment.

The dry powder product of this invention may be easily reconstituted into a slurry by merely mixing with water, while agitating.

The following examples are given for illustration only. As can be seen from these examples, the spray drying techniques employed are purely conventional.

*Example I*

Four liters of a water solution of copper sulfate is prepared containing 454 g. of $CuSO_4 \cdot 5H_2O$. There is then added 14.8 g. of calcium lignosulfonate. 454 g. of commercial grade lime is stirred in. The slurry contains 18 weight percent solids and has a specific gravity of 1.1. This suspension is dried under the following conditions. One liter is fed from a feed flask at a rate of about 250 cc. per minute into a cocurrent nozzle atomizing device using gravity. The dryer chamber has an inlet temperature of about 400° F. and an outlet temperature of about 200° F. The dry powder (170 g.) is collected from a cyclone collector. The powder has a copper content of 13.1%. The powder redisperses in water with agitation to uniformity to give a "hydrogel" suspension.

*Example II*

The drying procedure of Example I is followed except that the feed rate is adjusted to 250 cc. per minute and the inlet-outlet temperatures to 600° F. and 300° F., respectively. From 800 cc. of the slurry of Example I, 130 g. of dry powder having a copper content of 13.8% is collected.

*Example III*

The drying procedure of Example I is followed except that the feed rate is adjusted to 280 cc. per minute and the inlet-outlet temperatures to 500° F. and 190° F., respectively. From 1 liter of the slurry of Example I, 190 g. of dry powder having a copper content of 13.1% is collected.

*Example IV*

The drying procedure of Example I is followed except that the feed rate is adjusted to 250 cc. per minute and the inlet-outlet temperatures to 500° F. and 215° F., respectively. From 1 liter of the slurry of Example I, 175 g. of dry powder having a copper content of 13.5% is collected.

*Example V*

The drying procedure of Example I is followed except that the feed rate is adjusted to 175 cc. per minute and the inlet-outlet temperatures to 500° F. and 235° F., respectively. From 1.8 liters of the slurry of Example I, 365 g. of dry powder having a copper content of 13.4% is collected.

*Example VI*

To 4 liters of an aqueous copper sulfate solution containing 454 g. of $CuSO_4 \cdot 5H_2O$ is added 454 g. of CaO with stirring. There is then added 29.7 g. of sodium lignosulfonate. The suspension is stirred until well mixed and then is spray dried under the following conditions. The slurry contains 18 weight percent solids, having a specific gravity of 1.1. 6.6 liters is fed from a glass feed flask at a rate of 350 cc. per minute into a co-current nozzle atomizing device using gravity. The dryer chamber has an inlet temperature of 400° F. and an outlet temperature of 190° F. The dry powder (1395 g.) is collected from a cyclone collector. The powder has a copper content of 13.4%.

*Example VII*

The procedure of Example I is followed except that the slurry is prepared from 4 pounds of $CuSO_4 \cdot 5H_2O$, 1 pound of CaO and 0.07 pound of sodium lignosulfonate in 2 gallons of water.

Example VIII

The procedure of Example I is followed except that the slurry is prepared from 1 pound of $CuSO_4 \cdot 5H_2O$, 4 pounds of CaO and 0.09 pound of sodium lignosulfonate in 3 gallons of water.

Example IX

The procedure of Example I is followed except that 74 g. of sodium lignosulfonate replaces the calcium lignosulfonate.

Example X

The procedure of Example I is followed except that 55 g. of polyoxyethylene octylphenol, a wetting agent, is also added to the copper sulfate solution before addition of the lime.

Example XI

The procedure of Example VI is followed except that 111 g. of tridecyl alcohol is added to the Bordeaux slurry before drying.

Example XII

The dry powder of Example I is dispersed in water to give a concentration of 14.2 g. in 7.5 liters of water. This is applied using conventional spray apparatus to individual leaves of Travellers Tree, closely related to the Lanoua and having similar foliage characteristics. The reconstituted mixture is substantially equal to a freshly prepared mixture as measured by its suspension characteristics, slow settling rate, spreadability, coverage, weatherability and leaf tenacity.

Example XIII

The dry Bordeaux preparation of Example I is dispersed in water to give a concentration of 5 pounds of powder per 100 gallons of water. The suspension is applied to potatoes at the rate of 100 gallons per acre per application. The solution is effective in controlling late blight.

Example XIV

The procedure of Example I is followed except that 326 g. of $ZnSO_4 \cdot H_2O$ replaces the 454 g. of $CuSO_4 \cdot 5H_2O$. The powder redisperses in water with agitation to give a stable suspension.

Example XV

The procedure of Example I is followed except that half the $CuSO_4 \cdot 5H_2O$ (227 g.) is replaced by 163 g. of $ZnSO_4 \cdot H_2O$.

It has been shown in the preceding discussion and examples that dry powders which when contacted with water become Bordeaux compositions can be prepared by the methods outlined herein. Such aqueous suspensions have outstanding suspension characteristics, plant tenacity, weatherability and spreading characteristics. The compositions are suitably applied for the control of fungus infection of plants by employing them in fungicidally effective amounts to the plants according to the prior art teachings, using conventional apparatus such as conventional spray applicator equipment.

Having described our invention as related to the embodiments set out herein, it is our intention that the invention be not limited by any of the details of description, unless otherwise specified, but rather be construed broadly within its spirit and scope as set out in the accompanying claims.

We claim:

1. The method of making a dry particulate Bordeaux composition capable of being dispersed in water to form a stable fungicidal dispersion, comprising: forming a dispersion of said Bordeaux composition in water containing about 1–20% by weight of the total solids in said dispersion of a water soluble dispersing-stabilizing agent; and spray drying said dispersion in a heated gaseous fluid to a fluent powder dry to the touch.

2. The method of claim 1 wherein said agent comprises a water soluble lignosulfonate of the class consisting of alkali and alkaline earth lignosulfonates.

3. The method of claim 1 wherein said Bordeaux composition is a member of the class consisting of copper Bordeaux, zinc Bordeaux and mixtures thereof.

4. The method of claim 2 wherein said Bordeaux composition is a member of the class consisting of copper Bordeaux, zinc Bordeaux and mixtures thereof.

References Cited by the Examiner

UNITED STATES PATENTS 2,962,416  11/1960  Taylor _____ 167—16
2,998,345   8/1961  Rogers _____ 167—16

JULIAN S. LEVITT, *Primary Examiner.*

STANLEY J. FRIEDMAN, *Assistant Examiner.*